United States Patent
Lei et al.

(10) Patent No.: US 7,865,203 B2
(45) Date of Patent: Jan. 4, 2011

(54) METHOD FOR GROUPING WIRELESS DEVICES AND APPARATUS THEREOF

(75) Inventors: Ying-Chieh Lei, Kaohsiung (TW);
Te-Yu Lai, Miaoli County (TW);
Ching-Sung Lee, Hualien County (TW)

(73) Assignee: Industrial Technology Research Intitute, Hsinchu (TW)

( * ) Notice: Subject to any disclaimer, the term of this patent is extended or adjusted under 35 U.S.C. 154(b) by 639 days.

(21) Appl. No.: 11/946,018

(22) Filed: Nov. 27, 2007

(65) Prior Publication Data

US 2008/0280635 A1 Nov. 13, 2008

(30) Foreign Application Priority Data

May 7, 2007 (TW) .............................. 96116117 A

(51) Int. Cl.
*H04Q 7/20* (2006.01)

(52) U.S. Cl. ........................ 455/513; 455/509; 455/500; 455/517; 455/518; 455/67.11; 370/328; 370/329; 370/310; 370/343; 370/431

(58) Field of Classification Search ................. 455/513, 455/509, 501, 500, 518, 519, 517, 67.11, 455/423–425, 550.1, 422.1, 403, 426.1, 426.2, 455/452.1–453; 370/328, 329, 310, 343, 370/431, 434
See application file for complete search history.

(56) References Cited

U.S. PATENT DOCUMENTS

| | | | |
|---|---|---|---|
| 6,330,429 B1 | 12/2001 | He | |
| 6,529,136 B2 | 3/2003 | Cao et al. | |
| 7,035,618 B2 | 4/2006 | Schnurr | |
| 2005/0220131 A1* | 10/2005 | Ginzburg et al. | ............ 370/432 |
| 2005/0227724 A1 | 10/2005 | Tsai | |
| 2009/0042557 A1* | 2/2009 | Vardi et al. | ............... 455/422.1 |
| 2009/0129321 A1* | 5/2009 | Jain | ............................ 370/328 |

* cited by examiner

*Primary Examiner*—Keith T Ferguson
(74) *Attorney, Agent, or Firm*—Jianq Chyun IP Office

(57) ABSTRACT

A method for grouping wireless devices and an apparatus thereof are provided. First, the feature values of a plurality of access points (APs) detected by a wireless device are received, wherein these APs are designated as a first set, and the feature values of the APs constitute a feature vector. A first grouping process is performed to the wireless device according to the first set, which allocates the wireless device to an appointed clustering factory. A second grouping process is performed to the wireless device according to the feature vector, which divides all of the wireless devices within the appointed clustering factory into a member group or a noise group. Eventually, the grouping result is transmitted to the wireless device.

21 Claims, 6 Drawing Sheets

METHOD FOR GROUPING WIRELESS DEVICES AND APPARATUS THEREOF

CROSS-REFERENCE TO RELATED APPLICATION

This application claims the priority benefit of Taiwan application serial no. 96116117, filed on May 7, 2007. The entirety of the above-mentioned patent application is hereby incorporated by reference herein and made a part of this specification.

BACKGROUND OF THE INVENTION

1. Field of the Invention

The present invention generally relates to a method for grouping wireless devices and an apparatus thereof, in particular, to a method for grouping proximal wireless devices in consideration of space allocations thereof and an apparatus thereof.

2. Description of Related Art

The demands to location awareness services and location-based services have been increasing along with the widespread of wireless Internet devices, such as notebook computers, personal digital assistants (PDAs) etc. For example, when a wireless device needs to print a document, this document is automatically transmitted to a nearby printer to be printed, and when the wireless device has a projection task, the data to be projected is also automatically transmitted to a nearby projector. In other words, by grouping proximal wireless devices, the wireless device is automatically connected to those service providing devices within the same group, and accordingly, the wireless device can communicate with other nearby wireless devices. As described above, a mechanism for grouping proximal wireless devices so that users of the same group can interact with each other efficiently is an important issue in wireless communication application.

Three methods for grouping proximal wireless devices are usually used in today's wireless communication environment. FIG. 1 illustrates the first conventional method for grouping proximal wireless devices. Referring to FIG. 1, the first method is provided to group wireless devices based on the access points (APs) connecting to the communication network, namely, those wireless devices which connect to the communication network through the same AP are considered proximal wireless devices. As shown in FIG. 1, the wireless devices W1~W5 connect to the Internet through AP1, thus, the wireless devices W1~W5 are considered proximal wireless devices and are grouped together. While the wireless devices W6~W9 connect to the communication network through AP2, so the wireless devices W6~W9 are put into another group.

FIG. 2 illustrates the second conventional method for grouping proximal wireless devices. Referring to FIG. 2, the second method is to group wireless devices based on the signals received by the wireless devices from APs, namely, those wireless devices having their strongest signals received from the same AP are considered proximal wireless devices. As shown in FIG. 2, the signal strength of the received signals by the wireless devices W1~W4 from AP1 are within the same range, so that the wireless devices W1~W4 are considered proximal wireless devices and are grouped together as Group 1. While the signal strength of the received signals by the wireless devices W6~W9 are within the same range from AP2, so the wireless devices W6~W9 are put into another group as Group 2. As indicated in dot line 210 that the wireless devices are grouped according to the signal strength of the signals received. However, the wireless device W5 receives a stronger signal from the AP2 rather than that from the AP1, and is grouped as one member of the Group 2, instead of the desire to be grouped as the member of Group 1.

According to the third method for grouping wireless devices, the proximity of wireless devices are determined by accurately locating the wireless devices and then calculating the distances between them. The wireless devices can be accurately located through a global positioning system (GPS) or a wireless fidelity (Wi-Fi) positioning appliance, and then whether or not they are proximal wireless devices is determined according to a distance formula. However, since space allocations of the wireless devices are not considered in the three methods described above, the grouping result provided may not be satisfactory.

For example, FIG. 3 is a diagram illustrating the space allocations of wireless devices. Referring to FIG. 3, with the consideration of space allocation, the members X1~X6 (i.e. wireless devices) in the conference room should be in the same group, and this group should be separated from the members X7~X9 (i.e. wireless devices) outside of the conference room. However, the member X6 in the conference room and the member X7 out of the conference room may be put in the same group if the members are simply grouped based on the same AP they use for connecting to the communication network or the strength of the signals they receive from the same AP. Besides, even though proximal wireless devices can be determined accurately through accurate positioning, members in or out of the conference room cannot be distinguished effectively without adopting a map regarding the space allocation thereof. Besides, a radio map has to be established in advance through sampling point calculation and then the accurate locations of the wireless devices have to be calculated according to the signals received by the wireless devices if a Wi-Fi positioning appliance is used; thus, the complexity of actual operation is increased.

An improved accurate positioning method is disclosed in an article titled "WLAN location determination via clustering and probability distribution". According to this article, sampling points are established during an offline phase and those sampling points of the APs having the same Q strongest wireless signals are put in one group (sampling group). Thus, during a location determination phase, a suitable sampling group at a particular sampling point can be located based on only those APs having the Q strongest wireless signals so that the possible range of the user location is reduced.

A group notification system and associated method that allow particular activities to be executed based on the group dynamics are disclosed in U.S. Pat. No. 6,529,136. The group dynamics may be the proximity and direction of movement of group members or distances between groups.

A system of wireless proximity awareness and an associated method are disclosed in U.S. Pat. No. 7,035,618. When a mobile device is connected to a particular wireless tower which uses, for example, the global system for mobile communications (GSM) and a member in the friend list of the mobile device is also connected to the same wireless tower or to a proximal wireless tower which uses a different system, for example, a code division multiple access (CDMA) system, an event is triggered to notify these two wireless mobile devices that they are proximal. Similar to the method described above, this method cannot provide an effective grouping which conforms to the space allocation of the wireless devices.

A wireless network and an associated method for determining nearest wireless device are disclosed in U.S. Patent No. 20050227724, wherein a nearest wireless device is determined according to signal strengths measured between wireless devices and APs. For example, a notebook computer determines whether it is closer to a printer A or a printer B by measuring the signal strengths of the wireless network. The present disclosure is focused at locating a nearest signal wireless device or service device, but does not provide a method for grouping proximal wireless devices.

SUMMARY OF THE INVENTION

Accordingly, the present invention is directed to a method for grouping wireless devices, wherein the wireless devices are grouped according to the similarities of the numbers of access points (APs) collected by the wireless devices and the signal strengths thereof, and in addition, the wireless devices are grouped in consideration of the attenuations of radio signals of the APs detected by the wireless devices so that the grouping result can conform to the space allocation of the wireless devices.

The present invention is also directed to an apparatus for grouping wireless devices. The grouping apparatus is used for executing the calculations required by foregoing grouping method and has foregoing advantages.

The present invention provides a method for grouping wireless devices. First, the feature values of a plurality of access points (APs) detected by a wireless device are received, wherein the APs are designated as a first set, and the feature values of the APs constitute a feature vector. Next, a first grouping process is performed to the wireless device according to the first set, which allocates the wireless device to an appointed clustering factory. After that, a second grouping process is performed to the wireless device according to the feature vector corresponding to the wireless device, which divides all the wireless devices in the appointed clustering factory into group members and noises. Finally, the grouping result is transmitted to the wireless device.

The present invention further provides an apparatus for grouping wireless devices. The grouping apparatus includes a receiving unit, a grouping process unit, and an output unit. The receiving unit receives the feature values of a plurality of APs detected by a wireless device, wherein these APs are designated as a first set, and these feature values constitute a feature vector. The grouping process unit is coupled to the receiving unit, and the grouping process unit allocates the wireless device to a clustering factory according to the first set and divides all the wireless devices in the clustering factory into group members and noises according to the feature vector corresponding to the wireless device through a clustering algorithm. The output unit is coupled to the grouping process unit and transmits a grouping result to the wireless device.

Accordingly, in the present invention, because the attenuations of radio signals are increased by barriers in their surroundings, and also because the numbers of APs collected by proximal wireless devices within a particular space and signal strengths thereof are very similar, the wireless devices are grouped according to the feature values of the APs detected by the wireless devices during an online phase. In the present invention, it is not necessary to find out the accurate location of each wireless device through accurate positioning, and moreover, wireless devices are grouped with consideration of the space allocations thereof so that members in the same group can interact smoothly, for example, transmit files and provide services.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
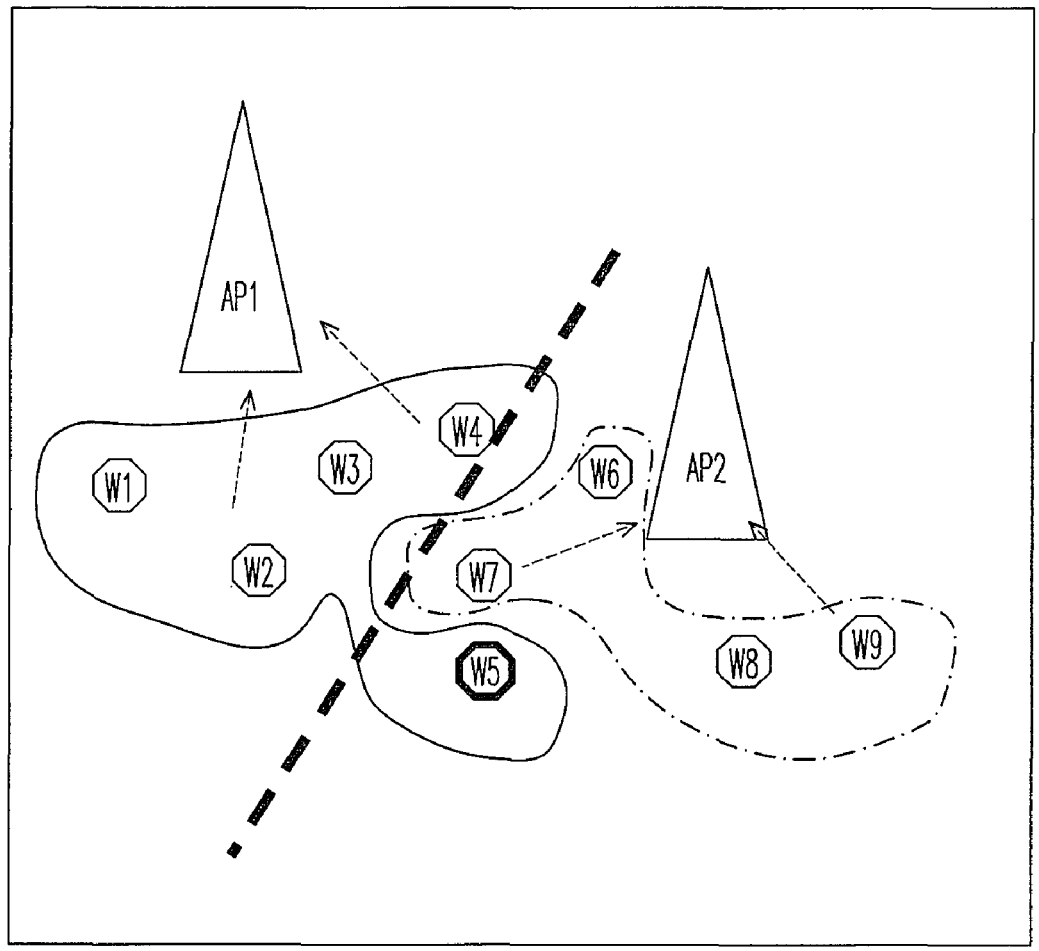
FIG. 1 illustrates a conventional method for grouping proximal wireless devices.
Figure 2:
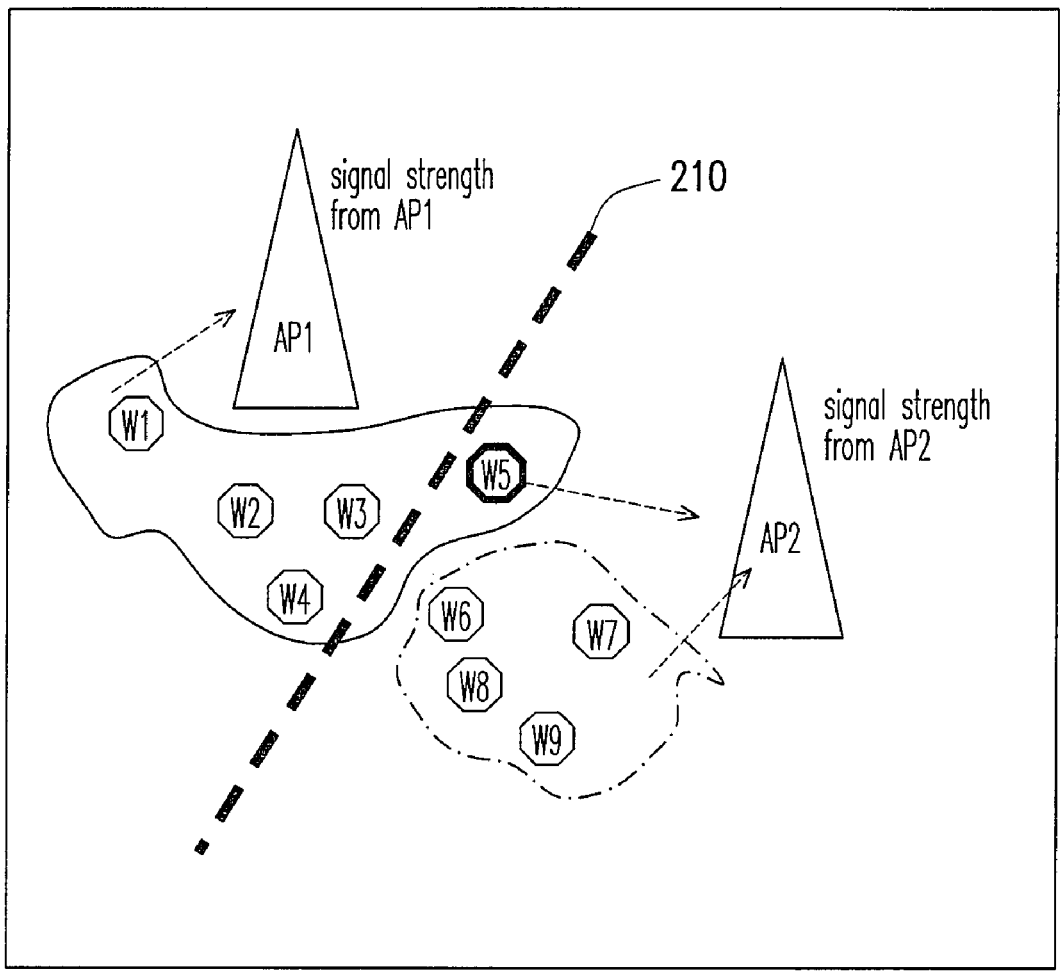
FIG. 2 illustrates another conventional method for grouping proximal wireless devices.

Reference will now be made in detail to the present preferred embodiments of the invention, examples of which are illustrated in the accompanying drawings. Wherever possible, the same reference numbers are used in the drawings and the description to refer to the same or like parts.

The present invention provides a method for grouping wireless devices. First, the feature values of a plurality of access points (APs) detected by a wireless device are received, in which the APs are designated as a first set, and the feature values, for example, the received signal strength indication (RSSI) of the APs constitute a feature vector. Next, a first grouping process is performed to the wireless device according to the first set, which allocates the wireless device to an appointed clustering factory. After that, a second grouping process is performed to the wireless device according to the feature vector corresponding to the wireless device, which divides all the wireless devices in the appointed clustering factory into group members and noises. Finally, the grouping result is transmitted to the wireless device.

According to an embodiment of the present invention, the first grouping process in the foregoing wireless device grouping method further includes following steps. First, whether there are clustering factories are determined, in which the APs in each of the clustering factories are designated as a second set. Next, when there are clustering factories, the first set and the second set of each clustering factory are united to obtain a third set, and a ratio of the number in the first set to the number in the third set is calculated. When the ratio is greater than a threshold, the appointed clustering factory is the clustering factory having the maximum ratio, and the second set corresponding to the clustering factory having the maximum ratio is the third set. A new clustering factory is established when there is no clustering factory or none of the ratios reaches the threshold, wherein the appointed clustering factory is the new clustering factory, and the second set corresponding to the new clustering factory is the first set.

According to an embodiment of the present invention, the second grouping process in the foregoing wireless device grouping method further includes following steps. First, a pre-grouping process is performed, which makes the dimensions of the feature vectors corresponding to the wireless devices in the appointed clustering factory to be the same. Next, the wireless devices in the appointed clustering factory are divided into group members and noises through a clustering algorithm according to the feature vectors corresponding to the wireless devices in the appointed clustering factory.

The present invention further provides an apparatus for grouping wireless devices. The grouping apparatus includes a receiving unit, a grouping process unit, and an output unit. The receiving unit receives the feature values collected by a wireless device, and these APs are designated as a first set, and these feature values constitute a feature vector. The grouping process unit is coupled to the receiving unit, and the grouping process unit allocates the wireless device to a clustering factory according to the first set and divides all the wireless devices in the clustering factory into group members and noises according to the feature vector collected by the wireless device through a clustering algorithm. The output unit is coupled to the grouping process unit and transmits a grouping result to the wireless device.

According to an embodiment of the present invention, the wireless device in the foregoing wireless device grouping apparatus includes a timing unit, a signal receiving unit, a signal processing unit, a packet transmitting unit, and a packet receiving unit. The timing unit accumulates a predetermined time. The signal receiving unit is coupled to the timing unit and receives a plurality of signal strengths of each AP during a sampling time at intervals of the predetermined time. The signal processing unit is coupled to the signal receiving unit and calculates an average value of the signal strengths of each AP, wherein the average value is the feature value of the AP. The packet transmitting unit is coupled to the signal processing unit and transmits the feature values of the APs to the receiving unit in the grouping apparatus. The packet receiving unit receives the grouping result from the output unit in the grouping apparatus, and the grouping result is displayed by a user interface in the wireless device.

Below, embodiments of the present invention will be described with reference to accompanying drawings.

Figure 4:
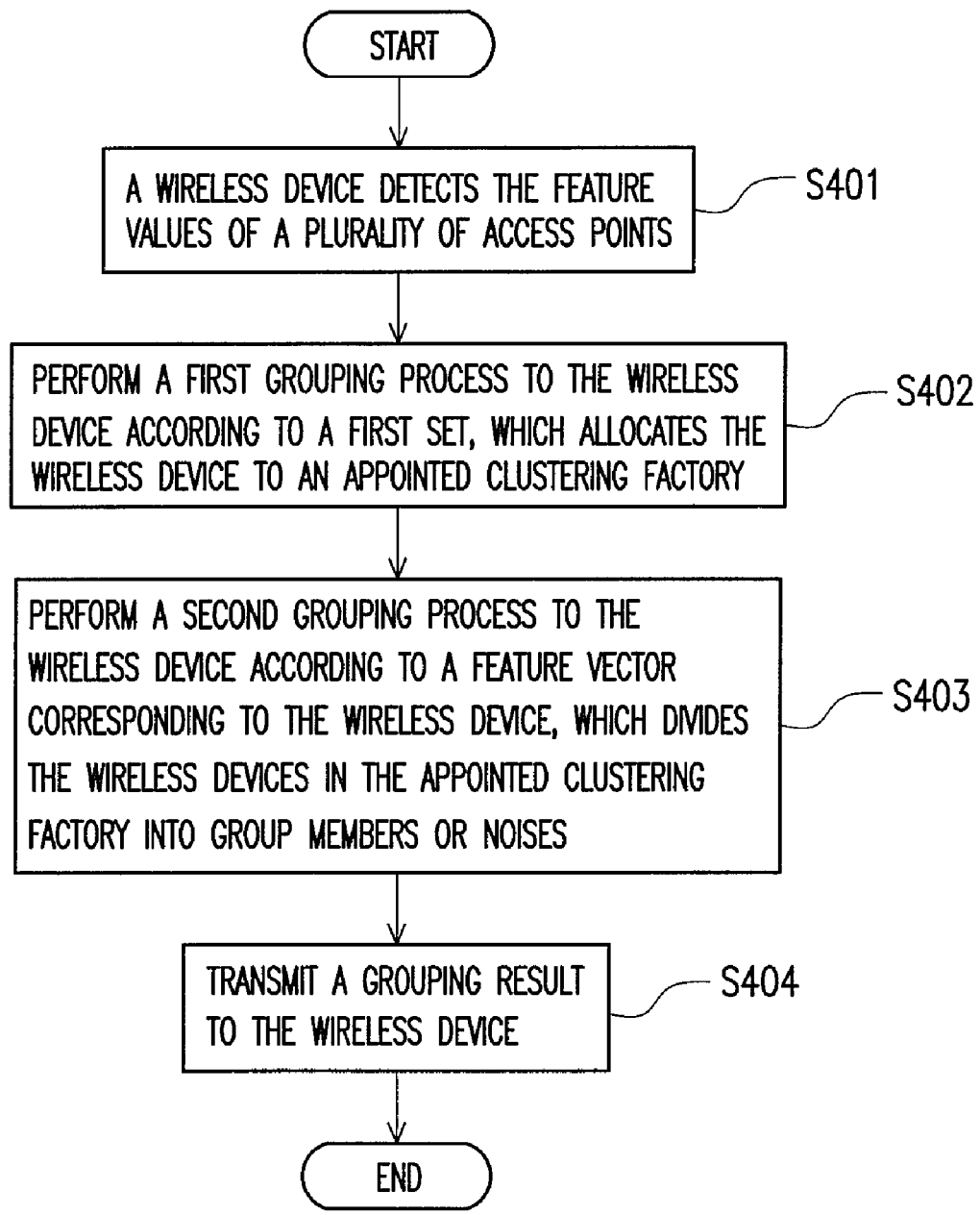
FIG. 4 is a flowchart illustrating a method for grouping wireless devices according to an embodiment of the present invention.

FIG. 4 is a flowchart illustrating a method for grouping wireless devices according to an embodiment of the present invention. Referring to FIG. 4, first, the feature values (for example, the received signal strength indications, RSSIs) of a plurality of APs detected by a wireless device are received by a clustering server (step S401), wherein the APs detected by the wireless device are designated as a first set SET1, and the feature values of the APs constitute a feature vector VEC. The clustering server is a wireless or cable apparatus for executing calculations required for the grouping operation and which will be described in detail later on.

For example, the feature values of AP1, AP2, and AP3 detected by a wireless device A received by the clustering server are respectively −30, −50, and −50. Then the APs which can be detected by the wireless device A are designated as a set $SET1_A$=(AP1, AP2, AP3), and the feature values thereof constitute a feature vector $VEC_A$=(AP1=−30, AP2=−50, AP3=−50). In the present embodiment, each AP is identified through the media access control (MAC) address thereof; however, the present invention is not limited thereto and other methods for identifying an AP may also be adopted.

It is assumed here that the clustering server receives the feature values of the APs detected by wireless devices A, B, C, and D (here only four wireless devices are described demonstratively), wherein the AP sets which can be detected by the wireless devices A, B, C, and D are as followings:

$SET1_A$=(AP1, AP2, AP3)
$SET1_B$=(AP1, AP2, AP3, AP4)
$SET1_C$=(AP1, AP3, AP4)
$SET1_D$=(AP1, AP5, AP6), and the feature values detected by the wireless devices A, B, C, and D respectively constitute following feature vectors:

$VEC_A$=(AP1=−30, AP2=−50, AP3=−50)
$VEC_B$=(AP1=−40, AP2=−30, AP3=−50, AP4=−90)
$VEC_C$=(AP1=−50, AP3=−50, AP4=−10)
$VEC_D$=(AP1=−80, AP5=−30, AP6=−40)

Thereafter, since the numbers of APs detected by proximal wireless devices are similar, the clustering server performs a first grouping process to the wireless devices according to the first set SET1, which allocates the wireless devices to a suitable clustering factory, namely, an appointed clustering factory (step S402), wherein the wireless devices in the same clustering factory are denoted as proximal wireless devices determined by the first grouping process.

The first set SET1 of the wireless device is united with the AP set of the clustering factory (i.e. the second set SET2) to obtain a third set SET3=SET1∪SET2, which means that SET3 is an union of the first set SET1 and the second set SET2. A ratio R of the number in the first set SET1 to the number in the third set SET3 is calculated, namely, R=Num(SET1)/Num(SET3). When the ratio R is greater than a threshold, the appointed clustering factory is the clustering factory having the maximum ratio R among those clustering factories having their ratio R greater than the threshold. If there is no clustering factory whose ratio R is greater than the threshold, namely, if there is no suitable clustering factory, a new clustering factory is established (step S403).

For example, initially, there is no clustering factory in the clustering server, and when the first set SETLA of the wireless device A is received, a clustering factory $FAC_1$ is established and the wireless device A is allocated to the clustering factory $FAC_1$. The second set $SET2_1$ of the clustering factory $FAC_1$ is the first set $SET1_A$ of the wireless device A, namely, $SET2_1$=$SET1_A$=(AP1,AP2,AP3).

Here the clustering factory $FAC_1$ already exists in the clustering server, thus, the first set $SET1_B$ of the wireless device B and the second set $SET2_1$ of the clustering factory $FAC_1$ are united to obtain the third set $SET3_{B1}$, namely, $SET3_{B1}$=(AP1, AP2,AP3,AP4). If the threshold is assumed to be 0.7, the ratio of the wireless device B to the clustering factory $FAC_1$ is $R_{B1}$=4/4=1>0.7. Since the ratio $R_{B1}$ is greater than the threshold, the wireless device B is also allocated to the clustering factory $FAC_1$. Here the second set $SET2_1$ of the clustering factory $FAC_1$ is $SET2_1$=$SET3_{B1}$=(AP1, AP2, AP3, AP4).

Similarly, the ratio of the wireless device C to the clustering factory $FAC_1$ is $R_{B1}$=3/4=0.75>0.7, thus, the wireless device C is also allocated to the clustering factory $FAC_1$. Here the second set $SET2_1$ of the clustering factory $FAC_1$ is $SET3_{C1}$=(AP1, AP2, AP3, AP4).

Furthermore, the first set $SET1_D$ of the wireless device D and the second set $SET2_1$ of the clustering factory $FAC_1$ are united to obtain a third set $SET3_{D1}$, namely, $SET3_{D1}$=(AP1, AP2, AP3, AP4, AP5, AP6), and the ratio of the wireless device D to the clustering factory $FAC_1$ is $R_{D1}$=3/6=0.5<0.7. Since the ratio $R_{D1}$ is smaller than the threshold, a new clustering factory $FAC_2$ has to be established, and the wireless device D is allocated to the new clustering factory $FAC_2$. Here the second set $SET2_2$ of the new clustering factory $FAC_2$ is the first set $SET1_D$ of the wireless device D, namely, $SET2_2$=$SET1_D$=(AP1, AP5, AP6).

In the present embodiment, foregoing assumptions, such as the sequence for processing the wireless devices A, B, C, and D and the value of the threshold, are made for the convenience of description but not for limiting the scope of the present invention. As described above, the wireless devices A, B, and C are allocated to the clustering factory $FAC_1$, and the wireless device D is allocated to the clustering factory $FAC_2$.

Figure 3:
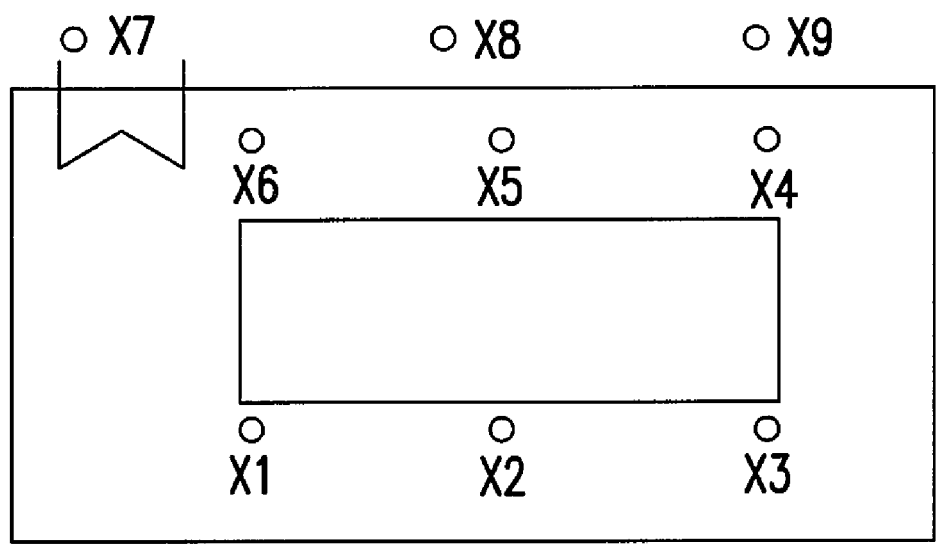
FIG. 3 illustrates the space allocations of wireless devices.
Figure 5:
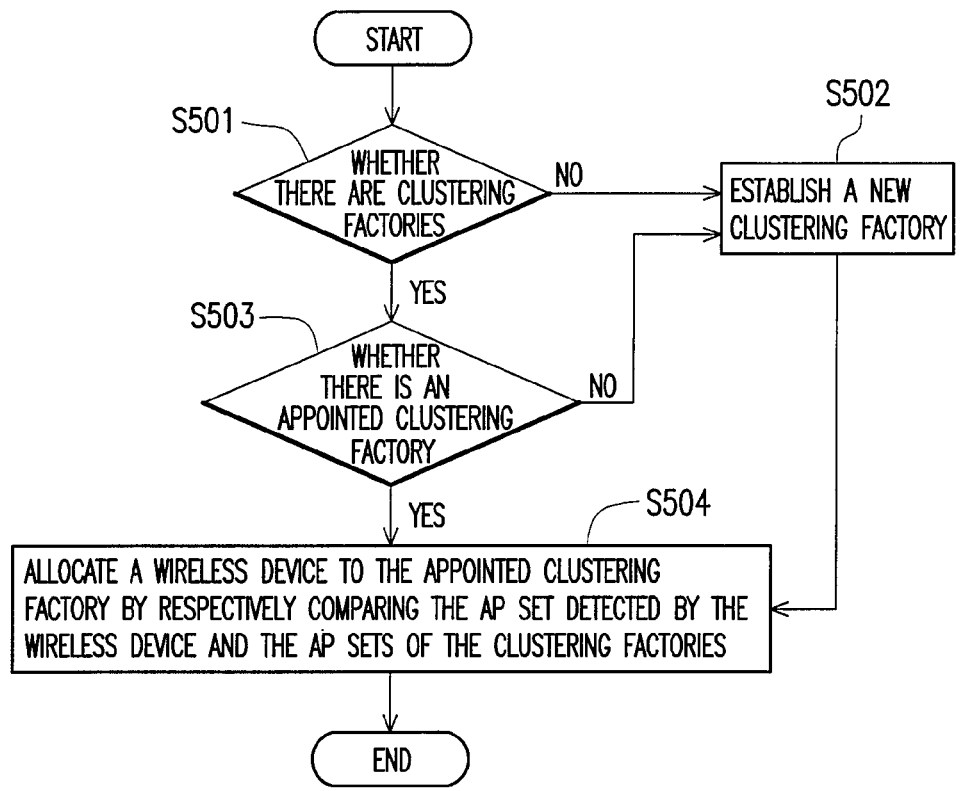
FIG. 5 is a flowchart illustrating a first grouping process according to the embodiment illustrated in FIG. 3.

The first grouping process (step S402) described above may have following procedure. FIG. 5 is a flowchart illustrating the first grouping process according to the embodiment illustrated in FIG. 3. Referring to FIG. 5, whether there is any clustering factory in the clustering server is first determined in the first grouping process (step S501), wherein the APs in each clustering factory are designated as a second set SET2. If there is no any clustering factory in the clustering server (at initial time), the clustering server establishes a new clustering factory (for example, the clustering factory $FAC_1$) as the appointed clustering factory (step S502), and allocates wireless devices (for example, the wireless device A) to the clustering factory $FAC_1$ (step S504). Thus, the AP set of the clustering factory $FAC_1$ (the second set $SET2_1$) is the AP set which can be detected by the wireless device A (the first set $SET1_A$), namely, $SET2_1=SET1_A=(AP1, AP2, AP3)$ Next, whether there is a suitable clustering factory is then determined if there are clustering factories in the clustering server (step S503). A suitable clustering factory is selected among the clustering factories by respectively comparing the AP set detected by the wireless device (the first set SET1) and the AP sets of the clustering factories (the second sets SET2), and the wireless device is allocated to the appointed clustering factory (step S504). A new clustering factory is established if there is no suitable clustering factory (step S502).

Thereafter, referring to FIG. 4 again, since the feature values (i.e. RSSIs) of the APs detected by proximal wireless devices are similar and the attenuations of radio signals are increased by barriers, the clustering server performs a second grouping process (fine grouping process) according to the feature vector corresponding to the wireless device, which divides the wireless devices in the appointed clustering factory into group members or noises with consideration of the space allocations thereof (step S403).

Even though the wireless devices in the appointed clustering factory are determined to be proximal wireless devices during the first grouping process (rough grouping process), the numbers of APs collected by the wireless devices may still be slightly different due to the differences of locations thereof. Thus, the dimensions of the feature vectors corresponding to the wireless devices in the clustering factory have to be made the same during the second grouping process, which is referred as pre-grouping process. An example of the pre-grouping process will be described below.

According to the pre-grouping process, null values of the feature vectors corresponding to the wireless device are filled with a predetermined value, for example, −100, so that the dimensions of the feature vectors collected by the wireless devices become the same. For example, the second set of the clustering factory $FAC_1$ is $SET2_1=(AP1, AP2, AP3, AP4)$, the feature vectors collected by the wireless devices A, B, and C in the clustering factory $FAC_1$ are changed as shown below:

$$VEC'_A = (-30, -50, -50, \boxed{-100})$$
$$VEC'_B = (-40, -30, -50, -90)$$
$$VEC'_C = (-50, \boxed{-100}, -50, -50)$$

It should be mentioned that some elements (APs) in the second set SET2 of the clustering factory are not important, or some other APs have to be referred to, thus, feature values of required APs in the second set SET2 of the clustering factory can be reduced or increased appropriately. The grouping mechanism has the best performance when the dimension of the feature vector is smaller than or equal to the number in the second set corresponding to the appointed clustering factory; however, the same function can be achieved even when the dimension of the feature vector is greater than the number of the second set.

Next, the wireless devices in each clustering factory are divided into group members and noises through a clustering algorithm, for example, K-mean clustering algorithm, according to the feature vector corresponding to the clustering factory. For example, by grouping the wireless devices A, B, and C in the clustering factory $FAC_1$ through K-mean clustering algorithm (K=2) according to the feature vectors $VEC'_A$, $VEC'_B$, and $VEC'_C$ respectively corresponding to the wireless devices A, B, and C, the wireless devices A and B are put into the same group while the wireless device C is put in another group by itself.

According to another embodiment of the present invention, the distance between two groups and the distances between the wireless devices in each group may be further compared through Euclidean calculations so as to determine whether two groups should be combined as one group and accordingly to avoid grouping each wireless device in the clustering factory as a group.

Figure 6:
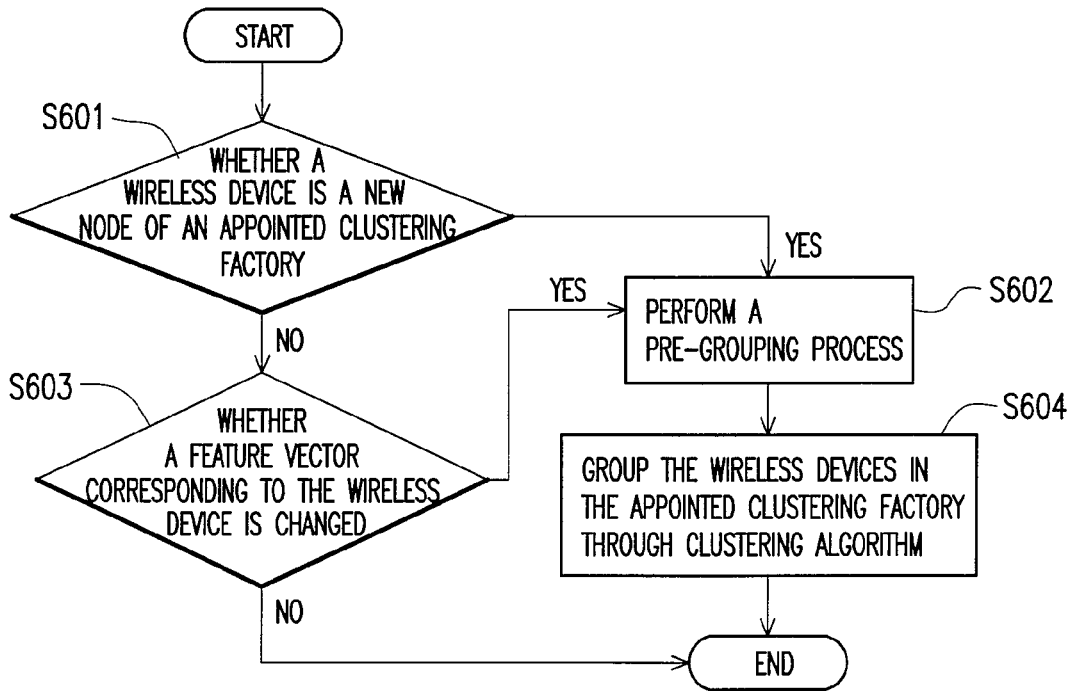
FIG. 6 is a flowchart illustrating a second grouping process according to the embodiment illustrated in FIG. 3.

The second grouping process (step S403) described above may have following procedure. FIG. 6 is a flowchart illustrating the second grouping process according to the embodiment illustrated in FIG. 3. Referring to FIG. 6, after the wireless device is allocated to a suitable clustering factory, the clustering server determines whether the wireless device is a new node of the appointed clustering factory (step S601), and if so, the pre-grouping process is performed (step 602).

Whether the feature vector corresponding to the wireless device is changed is determined if the wireless device is not a new node of the appointed clustering factory (step S603). The pre-grouping process is also performed if the feature vector is changed (step S602). Next, the clustering server divides the wireless devices in the clustering factory into group members and noises through a clustering algorithm (step S604).

Referring to FIG. 4 again, eventually, the clustering server transmits the grouping result and the information of the group members to those grouped wireless devices (step S404), so that the group members can connect to and communicate with each other. It should be noted that because the attenuations of radio signals will be increased due to barriers (for example, the wall of the conference room), the method described in the present embodiment for grouping wireless devices according to the feature values of the radio signals can provide a satisfactory grouping result with consideration of the space allocations of the wireless devices.

Figure 7:
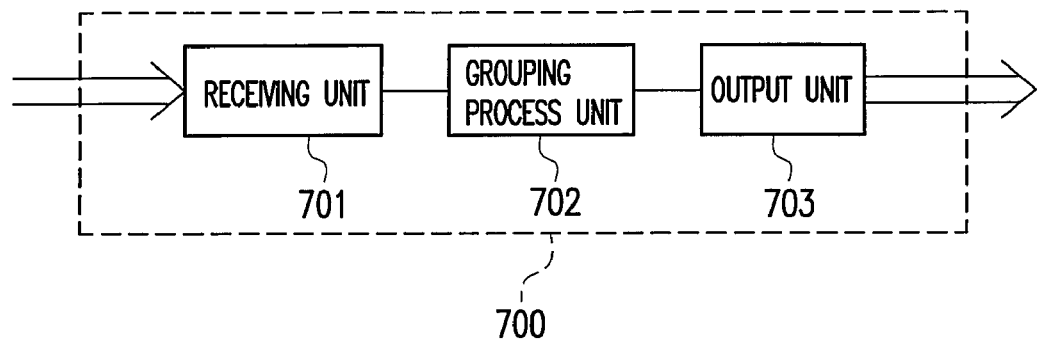
FIG. 7 is a block diagram of an apparatus for grouping wireless devices according to an embodiment of the present invention.

FIG. 7 is a block diagram of an apparatus for grouping wireless devices according to an embodiment of the present invention. Referring to FIG. 7, the grouping apparatus 700 includes a receiving unit 701, a grouping process unit 702, and an output unit 703. The grouping apparatus 700 is the clustering server as described in the embodiment of FIG. 4. The receiving unit 701 receives the feature values of a plurality of APs detected by a wireless device, wherein the APs detected by the wireless device are designated as a first set, and the feature values of the detected APs constitute a feature vector.

The grouping process unit 702 is coupled to the receiving unit 701 and allocates the wireless device to a suitable clustering factory according to the first set, namely, the grouping process unit 702 performs the first grouping process as illustrated in FIG. 4. Next, the grouping process unit 702 determines whether the wireless device is a new node of the appointed clustering factory or whether the feature vector corresponding to the wireless device is changed. If necessary, the grouping process unit 702 adjusts the feature vectors corresponding to the wireless devices in the appointed clustering factory to make the dimensions of the feature vectors to be the same.

Additionally, the grouping process unit 702 divides the wireless devices in the appointed clustering factory into group members and noises through a clustering algorithm according to the feature vectors corresponding to the wireless devices. Finally, the output unit 703 transmits the grouping result and the information of the group members to those grouped wireless devices. In another embodiment of the present invention, the grouping process unit 702 compares the distance between two groups and the distances between the wireless devices in each group through Euclidean calculation in order to determine whether two groups can be combined as one.

Figure 8:
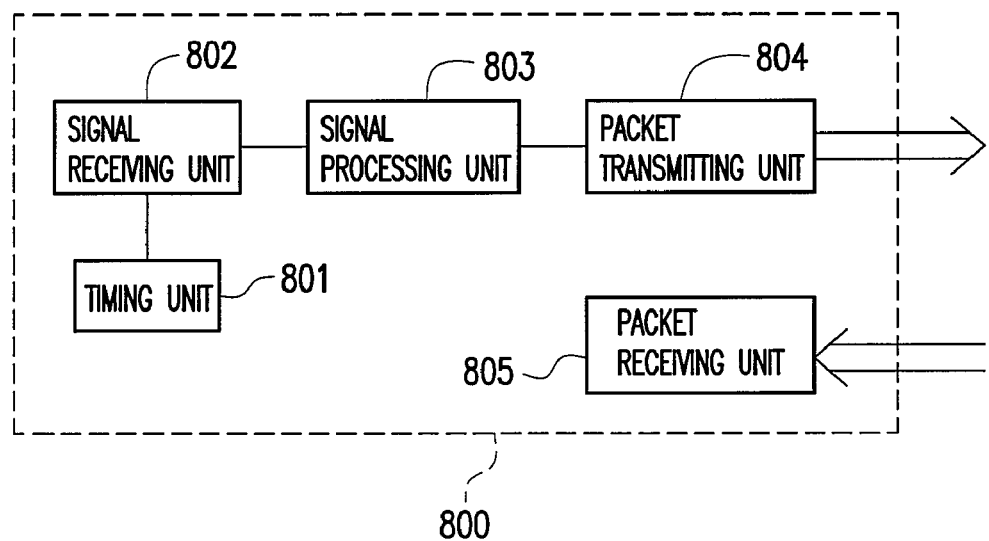
FIG. 8 is a block diagram of a wireless device according to an embodiment of the present invention.

FIG. 8 is a block diagram of a wireless device according to an embodiment of the present invention. Referring to FIG. 8, the wireless device 800 includes a timing unit 801, a signal receiving unit 802, a signal processing unit 803, a packet transmitting unit 804, and a packet receiving unit 805. The timing unit 801 accumulates a predetermined time and controls the signal receiving unit 802 to receive a plurality of signal strengths (i.e. RSSIs) of each AP during a sampling time at intervals of the predetermined time.

The signal processing unit 803 is coupled to the signal receiving unit 802 and calculates a value for each AP, and the value is the feature value of the AP. For example, in one embodiment, an average value of the signal strengths of each AP can be obtained as the aforesaid value, and the average value is used as the feature value of the AP. In another embodiment, probability distribution of the signal strength of each AP can also be used as the aforesaid value. Next, the packet transmitting unit 804 transmits the feature values of the APs to the receiving unit 701 in the grouping apparatus 700 as illustrated in FIG. 7 so that the grouping apparatus 700 can perform grouping processes accordingly. The packet receiving unit 805 receives the grouping result and the information of the group members from the output unit 703 in the grouping apparatus 700, and the grouping result is displayed by a user interface of the wireless device 800.

It should be mentioned that even though possible patterns of the wireless device grouping method and the associated apparatus have been provided in foregoing embodiments, it should be understood by those having ordinary skill in the art that the clustering algorithm or the number of groups may vary along with different applications, therefore the present invention is not restricted to the foregoing possible patterns. In other words, it is within the scope of the present invention as long as a rough grouping process is performed to the wireless devices according to the AP sets detected by the wireless devices and a fine grouping process is performed to the wireless devices according to the feature values of the APs detected by the wireless devices so as to group the wireless devices with consideration of the space allocations thereof.

In overview, according to the present invention, a rough grouping process is performed to wireless devices based on the characteristic that the numbers of APs respectively collected by proximal wireless devices are similar, which allocates the proximal wireless devices into an appointed clustering factory. Next, because the attenuations of radio signals are increased by barriers, a fine grouping process is performed to the wireless devices in the appointed clustering factory according to the feature values of the APs respectively collected by the proximal wireless devices so as to provide a grouping result conforming to the space allocations of the wireless devices. In overview, according to the present invention, a fine grouping process can also be performed directly to the wireless devices in the appointed clustering factory according to the feature values of the APs respectively collected by the proximal wireless devices so as to provide a grouping result conforming to the space allocations of the wireless devices.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for grouping wireless devices, comprising:
   receiving a plurality of feature values corresponding to a plurality of access points (APs) detected by a wireless device, wherein the APs are designated as a first set, and the plurality of the feature values of the APs constitute a feature vector;
   performing a first grouping process to the wireless device according to the first set in order to allocate the wireless device to an appointed clustering factory;
   performing a second grouping process to the wireless device according to the feature vector by the wireless device to obtain a grouping result by appointing each of the wireless devices in the appointed clustering factory to a member group or a noise group; and
   transmitting the grouping result to the wireless device.

2. The wireless device grouping method according to claim 1 further comprising:
   detecting a plurality of signal strengths of each of the APs during a sampling time at intervals of a predetermined time by using the wireless device; and
   calculating a value of the plurality of the signal strengths of each of the APs by the wireless device, the value being used as the feature value of the AP.

3. The wireless device grouping method according to claim 2, wherein the value is an average value of the plurality of the signal strengths of each of the APs calculated by the wireless device.

4. The wireless device grouping method according to claim 2, wherein the value is the value corresponding to an probability distribution of the plurality of the signal strengths of each of the APs calculated by the wireless device.

5. The wireless device grouping method according to claim 1, wherein the first grouping process comprises:
   determining whether or not there is a plurality of clustering factories, wherein the access points in each of the clustering factories are designated as a second set;
   when there are the clustering factories, uniting the first set and the second set of each of the clustering factories to obtain a third set, and calculating a ratio of the number in the first set to the number in the third set, wherein
   when the ratio is greater than a threshold, the appointed clustering factory being a clustering factory having the maximum ratio, and the second set corresponding to the clustering factory having the maximum ratio being the third set; and
   when there is no clustering factory or none of the ratios reaches the threshold, establishing a new clustering factory, the appointed clustering factory being the new clustering factory, and the second set corresponding to the new clustering factor being the first set.

6. The wireless device grouping method according to claim 1, wherein the second grouping process comprises:

performing a pre-grouping process to make the dimensions of the feature vectors corresponding to the wireless devices in the appointed clustering factory to be the same; and dividing the wireless devices in the appointed clustering factory into the member group or the noise group through a clustering algorithm according to the feature vectors corresponding to the wireless devices in the appointed clustering factory.

7. The wireless device grouping method according to claim 6, wherein the second grouping process further comprises:
comparing a first distance between the member group and the noise group and a plurality of second distances between the wireless devices in each group in order to optimize the grouping result.

8. The wireless device grouping method according to claim 6, wherein the second grouping process further comprises:
determining whether or not the wireless device is a new node of the appointed clustering factory; and
performing a pre-grouping process when the wireless device is a new node of the appointed clustering factory.

9. The wireless device grouping method according to claim 6, wherein the second grouping process further comprises:
determining whether or not the feature vector corresponding to the wireless device is changed; and
performing a pre-grouping process when the feature vector corresponding to the wireless device is changed.

10. A method for grouping wireless devices, comprising:
receiving a plurality of feature values corresponding to a plurality of access points (APs) detected by a wireless device, wherein the APs are designated as a first set, and the plurality of the feature values of the APs constitute a feature vector, and the wireless device is allocated to an appointed clustering factory according to the first set;
performing a grouping process to the wireless device according to the feature vector by the wireless device to obtain a grouping result by appointing each of the wireless devices in the appointed clustering factory to a member group or a noise group; and
transmitting the grouping result to the wireless device.

11. The wireless device grouping method according to claim 10 further comprising:
detecting a plurality of signal strengths of each of the APs during a sampling time at intervals of a predetermined time by using the wireless device; and
calculating a value of the plurality of the signal strengths of each of the APs by the wireless device, the value being used as the feature value of the AP.

12. The wireless device grouping method according to claim 11, wherein the value is an average value of the plurality of the signal strengths of each of the APs calculated by the wireless device.

13. The wireless device grouping method according to claim 11, wherein the grouping process comprises:
performing a pre-grouping process to make the dimensions of the feature vectors corresponding to the wireless devices in the appointed clustering factory to be the same; and
dividing the wireless devices in the appointed clustering factory into the member group or the noise group through a clustering algorithm according to the feature vectors corresponding to the wireless devices in the appointed clustering factory.

14. The wireless device grouping method according to claim 10, wherein the second grouping process further comprises:
comparing a first distance between the member group and the noise group and a plurality of second distances between the wireless devices in each group in order to optimize the grouping result.

15. The wireless device grouping method according to claim 10, wherein the second grouping process further comprises:
determining whether or not the wireless device is a new node of the appointed clustering factory; and
performing a pre-grouping process when the wireless device is a new node of the appointed clustering factory.

16. An apparatus for grouping wireless devices, comprising:
a receiving unit, receiving the feature values of a plurality of APs detected by a wireless device, wherein the APs are designated as a first set, and the feature values constitute a feature vector;
a grouping process unit, coupled to the receiving unit, the grouping process unit allocating the wireless device to a clustering factory according to the first set and dividing all the wireless devices in the clustering factory into group members and noises according to the feature vector; and
an output unit, coupled to the grouping process unit, transmitting a grouping result to the wireless device.

17. The wireless device grouping apparatus according to claim 16, wherein the wireless device comprises:
a timing unit, accumulating a predetermined time;
a signal receiving unit, coupled to the timing unit, receiving a plurality of signal strengths of each of the APs during a sampling time at intervals of the predetermined time.
a signal processing unit, coupled to the signal receiving unit, calculating a value of the signal strengths of each of the APs, wherein the value is the feature value of the AP; and
a packet transmitting unit, coupled to the signal processing unit, transmitting the feature values of the APs to the receiving unit; and
a packet receiving unit, receiving the grouping result from the output unit, wherein the grouping result is displayed in a user interface of the wireless device.

18. The wireless device grouping apparatus according to claim 17, wherein the value is an average value of the plurality of the signal strengths of each of the APs calculated by the wireless device.

19. The wireless device grouping apparatus according to claim 17, wherein the value is the value corresponding to an probability distribution of the plurality of the signal strengths of each of the APs calculated by the wireless device.

20. The wireless device grouping apparatus according to claim 16, wherein the grouping process unit makes the feature vectors corresponding to the wireless devices in the clustering factory to have the same dimensions.

21. The wireless device grouping apparatus according to claim 16, wherein the grouping process unit compares the distance between two groups and the distances between the wireless devices in each group in order to optimize the grouping result.

* * * * *